US008606286B2

(12) United States Patent
Vrzic et al.

(10) Patent No.: US 8,606,286 B2
(45) Date of Patent: Dec. 10, 2013

(54) E-PDCCH DESIGN FOR REDUCING BLIND DECODING

(71) Applicant: Research In Motion Limited, Waterloo (CA)

(72) Inventors: Sophie Vrzic, Ottawa (CA); Youn Hyoung Heo, Gyunggi-do (KR); Jack Anthony Smith, Valley View, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/626,595

(22) Filed: Sep. 25, 2012

(65) Prior Publication Data
US 2013/0183987 A1 Jul. 18, 2013

Related U.S. Application Data

(60) Provisional application No. 61/587,004, filed on Jan. 16, 2012.

(51) Int. Cl.
H04W 72/04 (2009.01)

(52) U.S. Cl.
USPC .......................... 455/450; 370/329

(58) Field of Classification Search
USPC .......... 455/450, 451, 452.1, 452.2, 464, 509; 370/329, 330, 331, 332, 341, 436, 437
See application file for complete search history.

(56) References Cited

U.S. PATENT DOCUMENTS

| 2009/0088148 | A1 | 4/2009 | Chung et al. |
| 2009/0168922 | A1 | 7/2009 | Malladi et al. |
| 2009/0209247 | A1 | 8/2009 | Lee et al. |
| 2009/0238091 | A1 | 9/2009 | Kim et al. |
| 2009/0245187 | A1 | 10/2009 | Nam et al. |
| 2009/0298493 | A1 | 12/2009 | Lin |
| 2010/0159935 | A1 | 6/2010 | Cai et al. |
| 2010/0172308 | A1 | 7/2010 | Nam et al. |
| 2010/0195583 | A1 | 8/2010 | Nory et al. |
| 2010/0322154 | A1 | 12/2010 | Chen et al. |
| 2011/0034175 | A1 | 2/2011 | Fong et al. |
| 2011/0070845 | A1* | 3/2011 | Chen et al. ............... 455/91 |
| 2011/0075624 | A1 | 3/2011 | Papasakellariou et al. |
| 2011/0103292 | A1* | 5/2011 | Pasad et al. .............. 370/315 |
| 2011/0149903 | A1 | 6/2011 | Krishnamurthy et al. |
| 2011/0170496 | A1 | 7/2011 | Fong et al. |
| 2011/0206014 | A1 | 8/2011 | Lee et al. |

(Continued)

FOREIGN PATENT DOCUMENTS

WO 2011099722 A3 8/2011

OTHER PUBLICATIONS

3GPP TS 36.213 v10.1.0 Release 10 pp. 1 to 115.*

(Continued)

Primary Examiner — Sam Bhattacharya
(74) Attorney, Agent, or Firm — Conley Rose, P.C.; J. Robert Brown, Jr.

(57) ABSTRACT

A user equipment (UE) is provided. The UE comprises a processor. The processor is configured to receive an extended physical downlink control channel (E-PDCCH) in an E-PDCCH region that has been partitioned into at least two partitions. A first partition contains control channel elements (CCEs) with a first set of aggregation levels, and a second partition contains CCEs with a second set of aggregation levels.

19 Claims, 16 Drawing Sheets

(56) References Cited

U.S. PATENT DOCUMENTS

| | | |
|---|---|---|
| 2011/0255485 A1 | 10/2011 | Chen et al. |
| 2011/0274066 A1 | 11/2011 | Tee et al. |
| 2012/0021756 A1 | 1/2012 | Kwon et al. |
| 2012/0120868 A1 | 5/2012 | Park et al. |
| 2013/0039284 A1 | 2/2013 | Marinier et al. |
| 2013/0039291 A1 | 2/2013 | Blankenship et al. |

OTHER PUBLICATIONS

Blankenship, Yufei Wu, et al.; U.S. Appl. No. 13/545,548, filed Jul. 10, 2012; Title: Enhanced Common Downlink Control Channels.
Heo, Youn Hyoung, et al.; U.S. Appl. No. 13/545,525, filed Jul. 10, 2012; Title: Enhanced PHICH Transmission for LTE-Advanced.
3GPP TS 36.211 V10.1.0; 3rd Generation Partnership Project; Technical Specification Group Radio Access Network; Evolved Universal Terrestrial Radio Access (E-UTRA); Physical Channels and Modulation; Release 10; Mar. 2011; 103 pages.
3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.
3GPP TS 36.212 V10.1.0; 3rd Generation Partnership Project; Technical Specification Group Radio Access Network; Evolved Universal Terrestrial Radio Access (E-UTRA); Multiplexing and Channel Coding; Release 10; Mar. 2011; 76 pages.
3GPP TS 36.212 V10.2.0; 3rd Generation Partnership Project; Technical Specification Group Radio Access Network; Evolved Universal Terrestrial Radio Access (E-UTRA); Multiplexing and Channel Coding; Release 10; Jun. 2011; 78 pages.
3GPP TS 36.213 V10.1.0; 3rd Generation Partnership Project; Technical Specification Group Radio Access Network; Evolved Universal Terrestrial Radio Access (E-UTRA); Physical Layer Procedures; Release 10; Mar. 2011; 115 pages.
3GPP TS 36.213 V10.2.0; 3rd Generation Partnership Project; Technical Specification Group Radio Access Network; Evolved Universal Terrestrial Radio Access (E-UTRA); Physical Layer Procedures; Release 10; Jun. 2011; 120 pages.
3GPP TS 36.331 V10.1.0; 3rd Generation Partnership Project; Technical Specification Group Radio Access Network; Evolved Universal Terrestrial Radio Access (E-UTRA); Radio Resource Control (RRC); Protocol Specification; Release 10; Mar. 2011; 290 pages.
3GPP TSG RAN WG1 Meeting #67; "Aspects on DL and UL Control Channels for HARQ with Enhanced PDCCH"; R1-113921; San Francisco, USA; Nov. 10-14, 2011; 4 pages.
3GPP TSG-RAN WG1 #67; "Search Space for Enhanced Control Channels"; R1-113680; San Francisco; Nov. 14-18, 2011; 2 pages.
3GPP TSG RAN WG1 #67; "E-PDCCH Design Aspects"; R1-114029; San Francisco, USA; Nov. 14-18, 2011; 4 pages.
3GPP TSG-RAN WG1 #67; "Views on Enhanced PHICH"; R1-113682; San Francisco; Nov. 14-18, 2011; 1 page.
3GPP TSG RAN WG1 Meeting #67; "PHICH Enhancements"; R1-114067; San Francisco, USA; Nov. 14-18, 2011; 3 pages.
PCT International Search Report; Application No. PCT/US2013/021428; Apr. 30, 2013; 3 pages.
PCT Written Opinion of the International Searching Authority; Application No. PCT/US2013/021428; Apr. 30, 2013; 4 pages.
Lindbom, Lars, et al.; "Enhanced Inter-Cell Interference Coordination for Heterogeneous Networks in LTE-Advanced: A Survey"; Dec. 7, 2011; 18 pages.
PCT International Search Report; Application No. PCT/US2013/029135; May 23, 2013; 3 pages.
PCT Written Opinion of the International Searching Authority; Application No. PCT/US2013/029135; May 23, 2013; 11 pages.
PCT International Search Report; Application No. PCT/US2013/032972; Jun. 6, 2013; 2 pages.
PCT Written Opinion of the International Searching Authority; Application No. PCT/US2013/032972; Jun. 6, 2013; 15 pages.

\* cited by examiner

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Table 1: Supported PDCCH formats in LTE

| 12 CCE (6 RBs) for E-PDCCH ||| 
|---|---|---|
| CCEs in region with DCIs of length 1 or 2 CCEs | CCEs in region with DCIs of length 4 or 8 CCEs | Maximum number of blind decodes per DCI format |
| 12 | 0 | 23 |
| 8 | 4 | 16 |
| 4 | 8 | 10 |
| 0 | 12 | 5 |

Table 2: Maximum number of blind decodes for an E-PDCCH region divided into two separate search spaces.

| Extended PCFICH for E-PDCCH region containing 12 CCEs | Number of CCEs in search space for aggregation level of 1 or 2 | Number of CCEs in search space for aggregation level of 4 or 8 |
|---|---|---|
| 00 | 12 | 0 |
| 01 | 8 | 4 |
| 10 | 4 | 8 |
| 11 | reserved | reserved |

Table 3: Extended PCFICH contents for an E-PDCCH region containing 12 CCEs.

| Extended PCFICH for E-PDCCH region containing 16 CCEs | Number of CCEs in search space for aggregation level of 1 or 2 | Number of CCEs in search space for aggregation level of 4 or 8 |
|---|---|---|
| 00 | 16 | 0 |
| 01 | 12 | 4 |
| 10 | 8 | 8 |
| 11 | 0 | 16 |

Table 4: Extended PCFICH contents for an E-PDCCH region containing 16 CCEs.

Figure 12

| E-PCFICH Contents | Number of RBs used for E-PDCCH |
|---|---|
| 000 | 1 |
| 001 | 2 |
| 010 | 3 |
| 011 | 4 |
| 100 | 5 |
| 101 | 6 |
| 110 | 7 |
| 111 | 8 |

Table 5: Extended PCFICH contents for the case where the E-PDCCH is not partitioned according to aggregation level.

MasterInformationBlock

```
-- ASN1START

MasterInformationBlock ::=      SEQUENCE {
    dl-Bandwidth                ENUMERATED {
                                    n6, n15, n25, n50, n75, n100},
    phich-Config                PHICH-Config,
    systemFrameNumber           BIT STRING (SIZE (8)),
    Common_E-PDCCH_region       BOOL,
    spare                       BIT STRING (SIZE (9))
}

-- ASN1STOP
```

Figure 20

E-PDCCH DESIGN FOR REDUCING BLIND DECODING

FIELD OF THE DISCLOSURE

The present disclosure relates to a physical downlink control channel in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 12 contains tables related to embodiments of the disclosure.

FIG. 20 is a diagram of a Master Information Block, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

In an LTE system, physical downlink control channels (PDCCHs) are used to carry downlink (DL) or uplink (UL) data scheduling information, or grants, from an eNB to one or more UEs. The scheduling information may include a resource allocation, a modulation and coding rate (or transport block size), the identity of the intended UE or UEs, and other information. A PDCCH could be intended for a single UE, multiple UEs or all UEs in a cell, depending on the nature and content of the scheduled data. A broadcast PDCCH is used to carry scheduling information for a physical downlink shared channel (PDSCH) that is intended to be received by all UEs in a cell, such as a PDSCH carrying system information about the eNB. A multicast PDCCH is intended to be received by a group of UEs in a cell. A unicast PDCCH is used to carry scheduling information for a PDSCH that is intended to be received by only a single UE.

Figure 1:
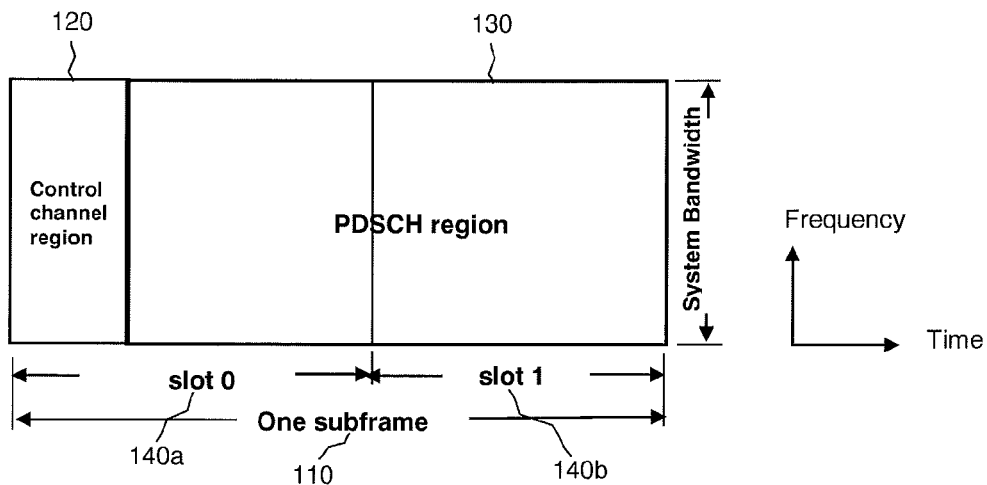
FIG. 1 is a diagram of a downlink LTE subframe, according to the prior art.

FIG. 1 illustrates a typical DL LTE subframe 110. Control information such as the PCFICH (physical control format indicator channel), PHICH (physical HARQ (hybrid automatic repeat request) indicator channel), and PDCCH are transmitted in a control channel region 120. The control channel region 120 includes the first few OFDM (orthogonal frequency division multiplexing) symbols in the subframe 110. The exact number of OFDM symbols for the control channel region 120 is either dynamically indicated by the PCFICH, which is transmitted in the first symbol, or semi-statically configured when cross carrier scheduling is configured in the case of carrier aggregation in LTE Rel-10.

The PDSCH, PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals are transmitted over both the control channel region 120 and the PDSCH region 130, as described in more detail below.

Each subframe 110 can include a number of OFDM symbols in the time domain and a number of subcarriers in the frequency domain. An OFDM symbol in time and a subcarrier in frequency together define a resource element (RE). A physical resource block (RB or PRB) can be defined as, for example, 12 consecutive subcarriers in the frequency domain and all the OFDM symbols in a slot in the time domain. An RB pair with the same RB index in slot 0 (140a) and slot 1 (140b) in a subframe can be allocated together.

Figure 2:
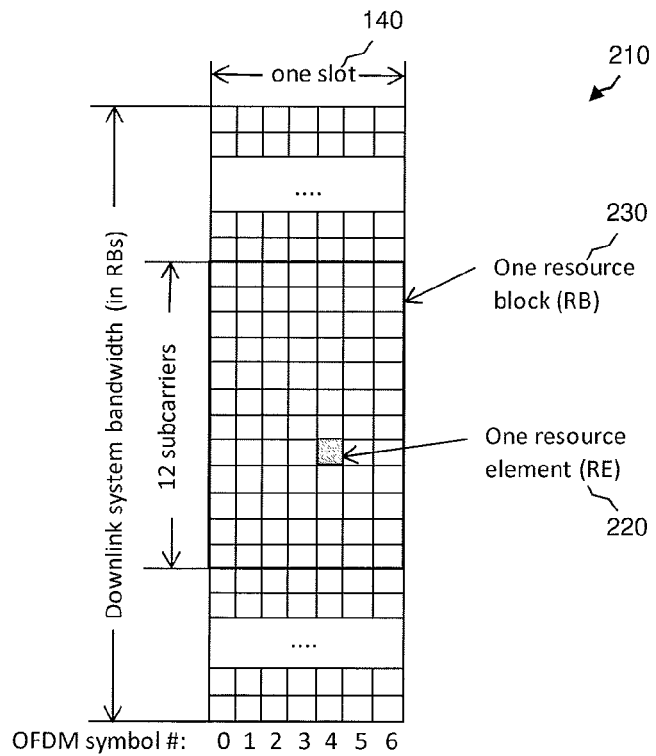
FIG. 2 is a diagram of an LTE downlink resource grid in the case of a normal cyclic prefix, according to the prior art.

FIG. 2 shows an LTE DL resource grid 210 within each slot 140 in the case of a normal cyclic prefix (CP) configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure. An RB 230 is the minimum unit used for the mapping of certain physical channels to REs 220.

Figure 3:
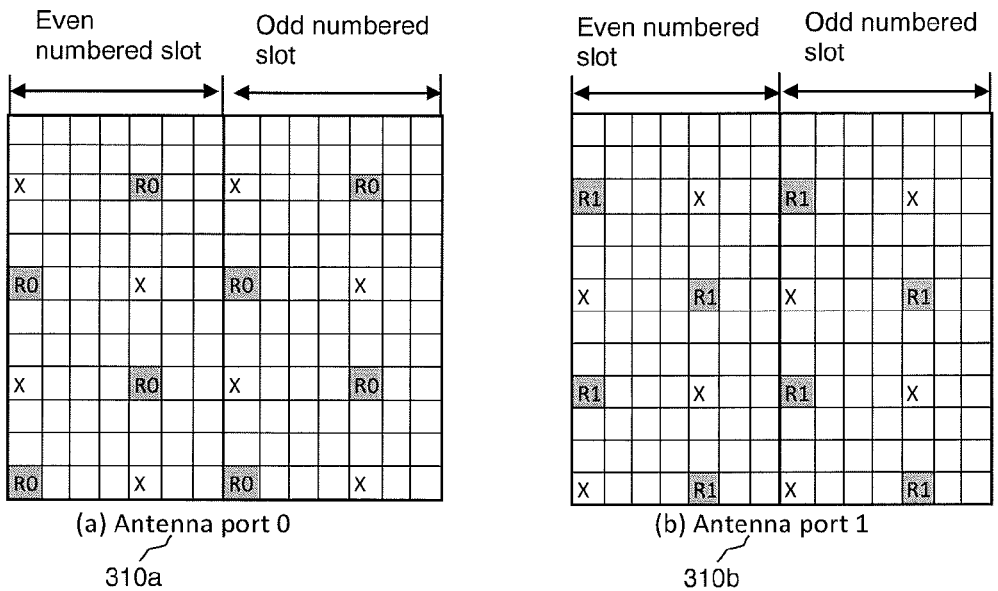
FIG. 3 is a diagram of a mapping of a cell-specific reference signal in a resource block in the case of two antenna ports at an eNB, according to the prior art.

For DL channel estimation and demodulation purposes, cell-specific reference signals (CRSs) can be transmitted over each antenna port on certain pre-defined time and frequency REs in every subframe. CRSs are used by Rel-8 to Rel-10 legacy UEs to demodulate the control channels. FIG. 3 shows an example of CRS locations in a subframe for two antenna ports 310a and 310b, where the RE locations marked with "R0" and "R1" are used for CRS port 0 and CRS port 1 transmission, respectively. REs marked with "X" indicate that nothing should be transmitted on those REs, as CRSs will be transmitted on the other antenna.

Figure 4:
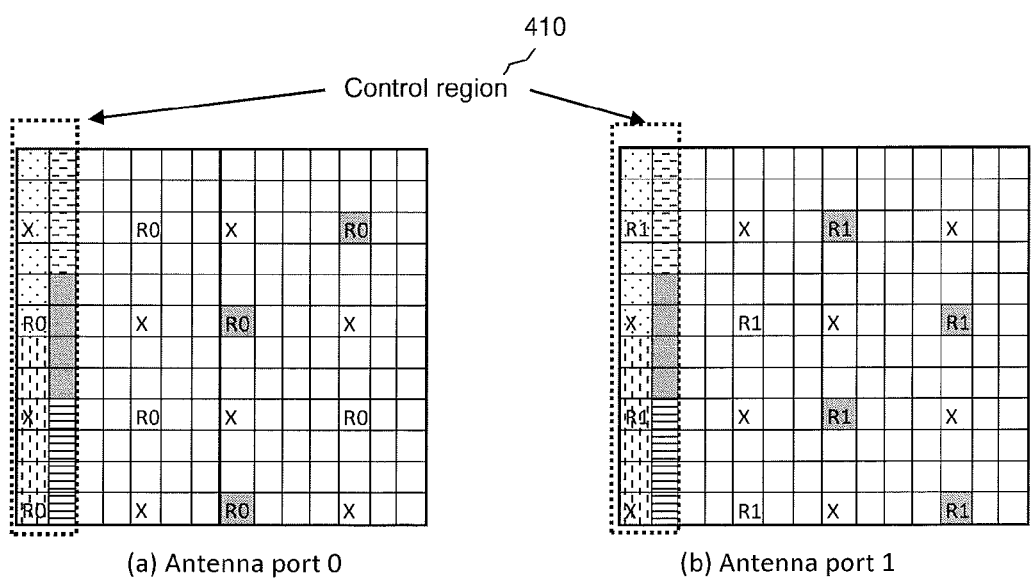
FIG. 4 is a diagram of a resource element group allocation in a resource block in the first slot when two antenna ports are configured at an eNB, according to the prior art.

Resource element groups (REGs) are used in LTE for defining the mapping of control channels such as the PDCCH to REs. A REG includes either four or six consecutive REs in an OFDM symbol, depending on whether the CRSs are included. For example, for the two-antenna port CRSs shown in FIG. 3, the REG allocation in each RB is shown in FIG. 4, where the control region 410 includes two OFDM symbols and different REGs are indicated with different types of shading. REs marked with "R0" or "X" in FIG. 4a or with "R1" or "X" in FIG. 4b are reserved for CRSs for antenna port 0 and antenna port 1, and therefore only four REs in each REG are available for carrying control channel data.

A PDCCH can be transmitted on an aggregation of one or more consecutive control channel elements (CCEs), where one CCE consists of, for example, nine REGs. The CCEs available for a UE's PDCCH transmission are numbered from 0 to $n_{CCE}-1$. In LTE, multiple formats are supported for the PDCCH as shown in Table 1 in FIG. 5.

The number of CCEs available in a subframe depends on the system bandwidth and the number of OFDM symbols configured for the control region. For example, in a 10 MHz system with three OFDM symbols configured for the control region and six groups configured for the PHICH, 42 CCEs are available for the PDCCH.

Multiple PDCCHs may be multiplexed in the control region in a subframe to support UL and DL data scheduling for one UE and to support DL and UL scheduling for more than one UE. For a given system bandwidth, the number of PDCCHs that can be supported in the control region also depends on the aggregation level used for each PDCCH which, for a given target packet error rate, is determined by the downlink received signal quality at a UE and the size of the downlink control information (DCI) to be carried by a PDCCH. In general, a high aggregation level is needed for a PDCCH intended for a UE that is at the cell edge and is far away from the serving eNB, or when a DCI with a large payload size is used.

The legacy PDCCH region in LTE may have capacity issues for some new applications or deployment scenarios where the number of scheduled UEs in a subframe could be large. Some examples include multiple user multiple input multiple output (MU-MIMO) transmission, coordinated multi-point (CoMP) transmission, heterogeneous network (hetnet) deployment with remote radio heads (RRHs) in a cell sharing the same cell ID, and carrier aggregation (CA). With these deployment scenarios, there may be a need to enhance the capacity of the PDCCH and at the same time to limit the number of blind decodes required by an advanced UE.

Figures 5, 6:
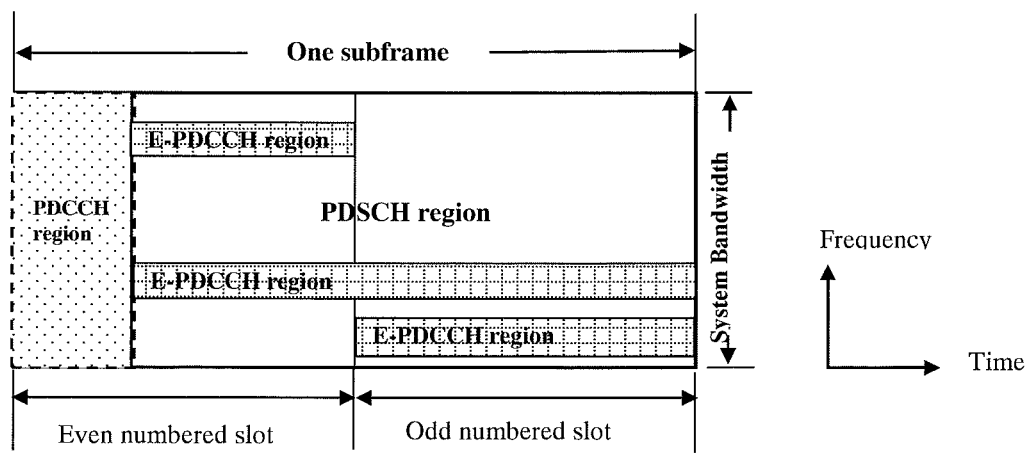
FIG. 5 is a table showing supported PDCCH formats in LTE, according to the prior art.
FIG. 6 is a diagram of E-PDCCH regions, according to an embodiment of the disclosure.

One approach for PDCCH capacity enhancement is to transmit DCI in the legacy PDSCH region. That is, some RBs in the traditional PDSCH region can be reserved for DCI transmission to UEs. Hereinafter, a physical downlink control channel transmitted in the legacy PDSCH region will be referred to as an enhanced or extended PDCCH (E-PDCCH). A set of RBs and OFDM symbols reserved for this purpose can be referred to as an E-PDCCH region. The E-PDCCH region in a subframe is not necessarily completely filled with E-PDCCHs in that any resources in the E-PDCCH region not used for E-PDCCH transmission can be assigned for PDSCH transmission. In addition, the legacy PDCCH region may or may not be present in a subframe containing an E-PDCCH region. The time and frequency resources of an E-PDCCH region may be configurable. An example of E-PDCCH regions is shown in FIG. 6.

In order to improve system capacity and coverage, an efficient and flexible design for the E-PDCCH may be desirable. For example, it may be undesirable for a UE to have to search the entire legacy PDCCH region to determine whether an E-PDCCH region is present in the legacy PDCCH region.

The embodiments provided herein minimize the maximum number of blind decodes needed for the E-PDCCH while allowing for a flexible E-PDCCH configuration that requires minimal overhead. The E-PDCCH design provided herein supports multiple control channel regions that may be used by different RRHs that may be distributed throughout a cell. A separate control channel region for each RRH allows reuse of resources, which can improve capacity. However, with an increase in the number of E-PDCCH regions, the UE search space may become large. This could result in a large number of blind decodes for the UE. Restricting the search space may reduce the number of blind decodes but may result in increased blocking probability as the UE may not be able to be scheduled in some subframes due to there being more allocations required than opportunities available in the UE search space. The E-PDCCH design provided herein can reduce the maximum number of blind decodes without increasing the blocking probability. Since the number of UEs scheduled may change from subframe to subframe, the E-PDCCH design includes low overhead and dynamic signaling to allow for some flexibility in the E-PDCCH configuration.

In LTE, discontinuous reception (DRX) can be used to save UE battery power when there is no data activity but a connection is still maintained. Once the UE goes to DRX mode, the UE monitors the PDCCH every DRX cycle for the length of an OnDuration timer, which is configured by higher layer signaling. A subframe in which the UE wakes up and monitors the PDCCH is defined as the active time. If no PDCCH is sent to the UE, the UE goes back to the sleep mode and turns off its receiver.

Figure 7:
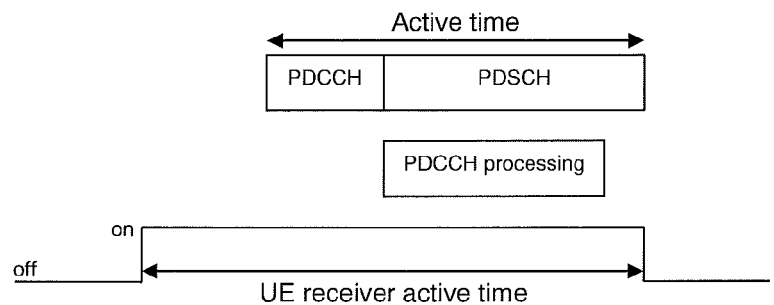
FIG. 7 is a diagram of UE receiver active time in the case of a PDCCH, according to the prior art.

FIG. 7 shows the UE receiver active time assuming the OnDuration timer is one subframe. The UE turns on the receiver before the PDCCH timing. After the UE receives a PDCCH resource, the UE starts decoding the PDCCH. In general, the PDCCH decoding time is less than a one millisecond subframe. After PDCCH processing is completed, if no PDCCH is sent to the UE, the UE turns off the receiver.

Figure 8:
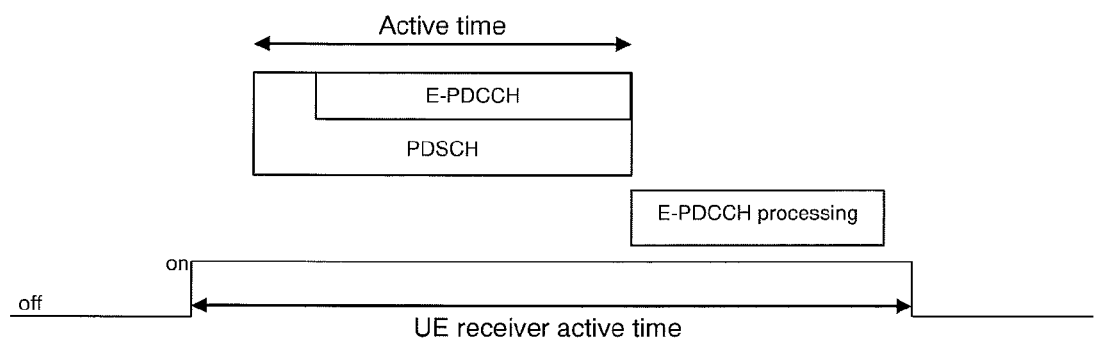
FIG. 8 is a diagram of UE receiver active time in the case of an E-PDCCH, according to an embodiment of the disclosure.

FIG. 8 shows the expected UE receiver active time when the E-PDCCH region is introduced. Similarly to the case of the PDCCH, the UE could start E-PDCCH decoding after the UE receives an E-PDCCH resource. Assuming the same processing time, it can be seen that the UE receiver active time becomes longer than the case of the PDCCH. The longer UE receiver active time can lead to more UE power consumption because the UE may need to turn on the radio frequency module and/or the baseband processing module during the UE receiver active time.

Six different sets of embodiments are provided herein to save battery power for UEs that have the E-PDCCH region enabled and that may be in DRX mode. The first set of embodiments deals with distributed E-PDCCH resources, the second set of embodiments deals with localized E-PDCCH resources, the third set of embodiments deals with UE power saving in DRX mode with the E-PDCCH, the fourth set of embodiments deals with the evolution of the PDCCH to the E-PDCCH, the fifth set of embodiments deals with an extended PHICH, and the sixth set of embodiments deals with resource mapping for the extended PHICH. Each set of embodiments will be briefly summarized, and then details of each set of embodiments will be provided.

In the first set of embodiments, in order to reduce blind decoding for UEs, multiple partitions within the E-PDCCH region may be configured for different aggregation levels. A UE can use a reduced maximum number of blind decodes to search each region that the UE is configured to use. Since UEs perform an exhaustive search of each search space, the blocking probability is reduced. The E-PDCCH region may be defined by specifying the number of resource blocks used for the region and by using a cell-specific hopping pattern. The cell-specific hopping pattern may change from subframe to subframe to provide more frequency diversity.

If the E-PDCCH region is divided into multiple search spaces, then the E-PDCCH configuration information may be semi-statically signaled using radio resource control (RRC) signaling. Alternatively, the E-PDCCH configuration information may be dynamically signaled using a new signaling message (an extended PCFICH or E-PCFICH) in the common search space within the legacy PDCCH region. Alternatively, the E-PCFICH may be located within the E-PDCCH region, and RRC signaling may be used to inform the UEs of the number of CCEs used for the E-PCFICH.

If multiple E-PDCCH regions are configured (e.g., for multiple RRHs) then the number of RBs for each E-PDCCH region can be included in the configuration information. Each of the configured regions may have an associated E-PCFICH to indicate how the resources within the region are partitioned into different search spaces. Since the UEs may be instructed to monitor only one E-PDCCH region or a limited number of regions, the maximum number of blind decodes performed by the UEs can be controlled.

Alternatively, instead of partitioning the E-PDCCH region for the different aggregation levels, the region may consist of predefined opportunities for the different aggregation levels. The blind decoding opportunities may begin at the first CCE of the E-PDCCH region and continue every L CCEs, where L represents the aggregation level. The E-PCFICH can be used to indicate the size of the E-PDCCH region.

In the second set of embodiments, the UE-specific E-PDCCH search space may depend on the UE's radio network temporary identifier (RNTI) within the localized E-PDCCH region. The search space may also depend on the subframe number in order to provide some user diversity (i.e., to prevent the case where two RNTIs map to the same search space and therefore cannot be scheduled simultaneously).

An E-PDCCH region may be defined within each sub-band for scheduling resources within the sub-band. Multiple search spaces may be defined within each sub-band for different aggregation levels in order to reduce the maximum number of blind decodes required by each UE. An extended PCFICH or a new DCI may also be transmitted within the legacy PDCCH region to indicate the presence of the localized E-PDCCH region.

In the third set of embodiments, when the UE goes to DRX mode, the UE monitors only the legacy PDCCH region during the wake-up time. The UE begins to monitor the E-PDCCH k subframes after receiving the PDCCH, where k is pre-determined or semi-statically configured.

Alternatively, the UE monitors the E-PDCCH only in the first slot during active time. The UE starts monitoring the second slot of the E-PDCCH when there is DCI for that UE or when the UE sends a scheduling request. If the UE monitors the E-PDCCH in the first slot only, the UE can start E-PDCCH decoding immediately after the first slot. Consequently, the receiver active time can be reduced by one slot.

Alternatively, the UE monitors the E-PDCCH for the first M OFDM symbols during active time. The value M can be determined based on the number of OFDM symbols on which one CCE is distributed or on which the PDCCHs that the UE should monitor are distributed. Once the UE receives the PDCCH in the active mode, the UE increases the number of PDCCH candidates so that the UE monitors the whole E-PDCCH region.

In the fourth set of embodiments, the size of the legacy PDCCH region is semi-statically configured. RRC signaling is used to indicate the starting OFDM symbol of the PDSCH region when only the E-PDCCH is configured. Legacy UEs can still decode the PCFICH to determine the starting OFDM symbol. If there are no active legacy UEs present, then the legacy PDCCH, PCFICH and PHICH may be removed and the PDSCH region may start on the first OFDM symbol. An extended PHICH region may be defined for signaling downlink acknowledgements and negative acknowledgements when the E-PDCCH is used.

System information for idle mode UEs may be scheduled in the E-PDCCH region. An indicator can be included in the master information block to inform the UEs that the system information is located in the E-PDCCH region. A spare bit in an RRC signaling message can be used to indicate the existence of a common E-PDCCH region. The exact E-PDCCH region for the common search space can be predefined or the configuration information could be included in the master information block.

In the fifth set of embodiments, a new PHICH group offset parameter may be signaled to advanced UEs as part of the E-PDCCH configuration information. The number of PHICH groups for the E-PDCCH region may also be signaled to the advanced UEs as part of the E-PDCCH configuration information.

In the sixth set of embodiments, the extended PHICH group RNTI and the number of REGs used for the extended PHICH resources are signaled to the UEs along with the E-PDCCH configuration information. A new extended PHICH resource mapping method may be defined. The mapping may be a function of the total number of E-PDCCH RBs and the total number of extended PHICH groups, which may be signaled to advanced UEs along with the E-PDCCH configuration information. The number of RBs that are used for the extended PHICH and that are multiplexed with the PDSCH may also be signaled to the advanced UEs. A cell-specific hopping pattern may be defined. Advanced UEs know which REs in the PDSCH RBs are used by the extended PHICH, and hence PDSCH data can be rate-matched so that the PDSCH data does not use REs for the extended PHICH.

Details about each of these sets of embodiments will now be provided. A detailed design of the E-PDCCH is described that can minimize the overhead required for the E-PDCCH and minimize the maximum number of blind decodes performed by advanced UEs.

Figure 9:
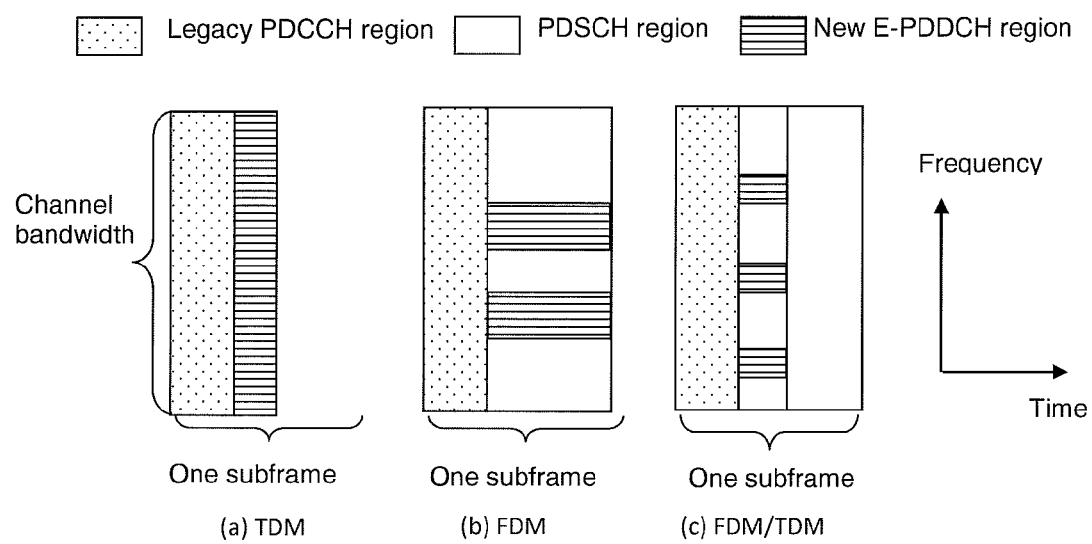
FIG. 9 is a diagram of examples of different multiplexing schemes for an E-PDCCH and a PDSCH, according to an embodiment of the disclosure.

There are several options for multiplexing an E-PDCCH region with the PDSCH, including frequency division multiplexing (FDM), time division multiplexing (TDM) or a combination of FDM and TDM. In FDM multiplexing, the E-PDCCH and PDSCH occupy different resource blocks (PRB pairs). In TDM multiplexing, the E-PDCCH and PDSCH occupy different OFDM symbols. For example, the E-PDCCH can take the first several OFDM symbols immediately after the legacy PDCCH region, while the PDSCH region can take the rest of the OFDM symbols in the subframe. In the combined FDM/TDM option, the E-PDCCH may occupy several OFDM symbols in certain RBs, while the PDSCH occupies the remaining OFDM symbols in the same RBs. For the remaining RBs not used for the E-PDCCH, all OFDM symbols can be used for PDSCH transmission. The different multiplexing options are illustrated in FIG. 9.

An E-PDCCH region may be configured for a number of purposes. For example, an E-PDCCH region may be configured for each RRH within a macro cell to allocate resources to UEs within the coverage area of the RRH. Each E-PDCCH region may be distributed across the entire system bandwidth. The resource elements within each E-PDCCH region may form REGs and CCEs as in the legacy PDCCH region. Advanced UEs may need to identify where the resources for the E-PDCCH region are located and how to search the E-PDCCH region.

Since the DCIs contained within the E-PDCCH region may be transmitted over one, two, four or eight CCEs, if the DCIs for the different UEs are distributed randomly (or based on scheduling order) within the E-PDCCH region, then the UEs must begin blind decoding at the beginning of each CCE and must check all the possible aggregation levels. This can result in a large number of blind decodes for the UEs. Although it is possible to assign each UE with a few starting points for the blind decoding, such an assignment may lead to unused resources within the region and thus may lead to inefficient use of the resources allocated to the E-PDCCH.

In the first set of embodiments, to avoid unused resources, the PDCCHs for the different UEs can be packed within the E-PDCCH region. In order to reduce the amount of blind decoding for the UEs, multiple partitions may be configured for the different aggregation levels. For example, one region may be used for grouping aggregation levels of one or two CCEs, and another region may be used for aggregation levels of four or eight CCEs. With the resources divided in this way, the UEs can systematically search each region and reduce the number of blind decodes. Since the UEs perform an exhaustive search of each search space, the blocking probability is reduced.

Figure 10:
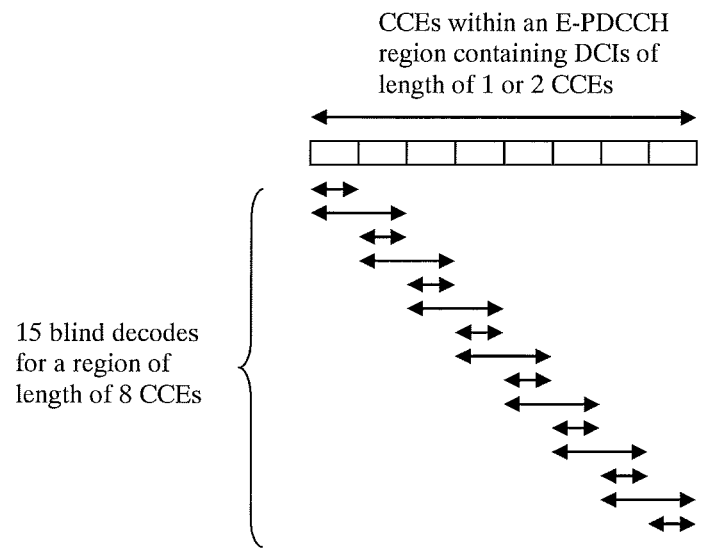
FIG. 10 is an illustration of a UE's blind decoding procedure for an E-PDCCH region containing DCIs of length equal to one or two CCEs, according to an embodiment of the disclosure.

The blind decoding required for an E-PDCCH region for DCIs transmitted over one or two CCEs is illustrated in FIG. 10. It can be seen that a blind decode occurs for one CCE starting at the beginning of the E-PDCCH region, and then a blind decode occurs for two CCEs starting at the beginning of the E-PDCCH region. Blind decodes then occur for one and two CCEs starting at the second CCE. This procedure then continues for the rest of the CCEs in the region, giving a total of 15 blind decodes for the entire region.

The maximum number of blind decodes for a region containing DCIs with a length of one or two CCEs is given by the following equation.

$$N_{BD}^{(1,2)} = \begin{cases} 2(n_{CCE}^{(1)} - 1) + 1, & n_{CCE}^{(1)} \geq 1 \\ 0, & \text{otherwise} \end{cases}$$

The parameter $n_{CCE}^{(1)}$ represents the number of CCEs in the region with the minimum DCI length of one CCE.

Figure 11:
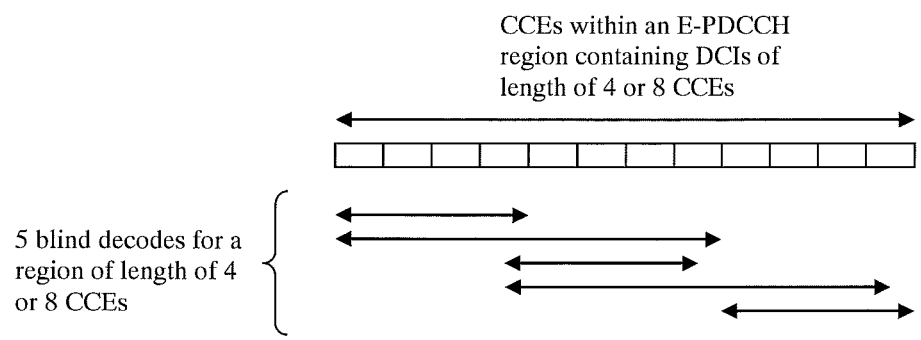
FIG. 11 is an illustration of a UE's blind decoding procedure for an E-PDCCH region containing DCIs of length equal to four or eight CCEs, according to an embodiment of the disclosure.

The blind decoding procedure for an E-PDCCH region containing DCIs with a length of four or eight CCEs is illustrated in FIG. 11. It can be seen that a blind decode occurs for four CCEs starting at the beginning of the E-PDCCH region, and then a blind decode occurs for eight CCEs starting at the beginning of the E-PDCCH region. Blind decodes then occur for four and eight CCEs starting at the fifth CCE. A blind decode then occurs for four CCEs starting at the ninth CCE, giving a total of five blind decodes for the entire region.

The maximum number of blind decodes for a region containing DCIs with a length four or eight CCEs is given by the following equation.

$$N_{BD}^{(4,8)} = \begin{cases} 2(\lfloor n_{CCE}^{(4)}/4 \rfloor - 1) + 1, & n_{CCE}^{(4)} \geq 4 \\ 0, & \text{otherwise} \end{cases}$$

The parameter $n_{CCE}^{(4)}$ represents the number of CCEs in the region with the minimum DCI length of four CCEs.

The maximum number of blind decodes for the two defined E-PDCCH regions is given by the following equation.

$$N_{BD}^{EPDCCH} = N_{BD}^{(1,2)} + N_{BD}^{(4,8)}$$

To illustrate the reduction in the maximum number of blind decodes required, this approach of separating the transmission of the DCIs into two regions can be compared with the case where all the DCIs are contained within one region. If twelve CCEs (six RBs) are allocated for the E-PDCCH region, the maximum number of blind decodes for all aggregation levels would be 37 blind decodes for each DCI format (12 blind decodes with a length of one CCE+11 blind decodes with a length of two CCEs+9 blind decodes with a length of four CCEs+5 blind decodes with a length of eight CCEs).

The maximum number of blind decodes per DCI format for the different configurations under the approach provided herein is illustrated in Table 2 in FIG. 12. In the table, the first column represents the number of CCEs used for a region containing DCIs with a length of one or two CCEs, the second column represents the number of CCEs used for a region containing DCIs with a length of four or eight CCEs, and the third column represents the maximum number of blind decodes per DCI in searching both regions.

If a search space within the E-PDCCH region is large (i.e., greater than a pre-determined number of CCEs) then the UEs may be allocated a subset of the entire search space. The subset may be determined by the UE's RNTI and subframe number.

The E-PDCCH region may be defined by specifying the number of resource blocks used for the region and by using a cell-specific hopping pattern. The cell-specific hopping pattern may change from subframe to subframe to provide more frequency diversity. The cell-specific hopping pattern will be known to the UEs and will define the starting RB for the E-PDCCH region. The number of RBs used for the E-PDCCH region may be signaled to the UEs using RRC signaling. If the region is divided into multiple search spaces, then this information may be semi-statically signaled using RRC signaling or may be dynamically signaled using a new signaling message in the common search space within the legacy PDCCH region.

The dynamic signaling option has a function similar to that of the PCFICH, since the dynamic signaling option provides a map of the new E-PDCCH region. In order to maintain the same level of performance as the PCFICH in the legacy system, the new signaling message or the E-PCFICH may need to have a size similar to that of the legacy PCFICH (i.e., two bits transmitted over four REGs). The number of bits used for the E-PCFICH may depend on the number of CCEs used for the E-PDCCH region. For the example given in Table 2 where the E-PDCCH region consists of 12 CCEs, two bits may be required. For E-PDCCH regions that require more CCEs, the number of bits for the E-PCFICH may be larger. Alternatively, the possible configurations may be limited to keep the same size of two bits. The E-PCFICH may be located within the E-PDCCH region, and RRC signaling may be used to inform the UEs of the number of CCEs used for the E-PCFICH. Table 3 and Table 4 in FIG. 12 illustrate examples of the contents of the E-PCFICH for the cases where the E-PDCCH region contains 12 and 16 CCEs, respectively.

If multiple E-PDCCH regions are configured (e.g., for multiple RRHs), then the number of RBs for each E-PDCCH region can be included in the configuration information. The UEs can determine the RBs used for each region based on the order of the configured regions. Each of the configured regions may have an associated E-PCFICH to indicate how the resources within the region are partitioned into different search spaces. Since the UEs may be instructed to monitor only one E-PDCCH region or a limited number of regions, the maximum number of blind decodes performed by the UEs can be limited.

Figure 13:
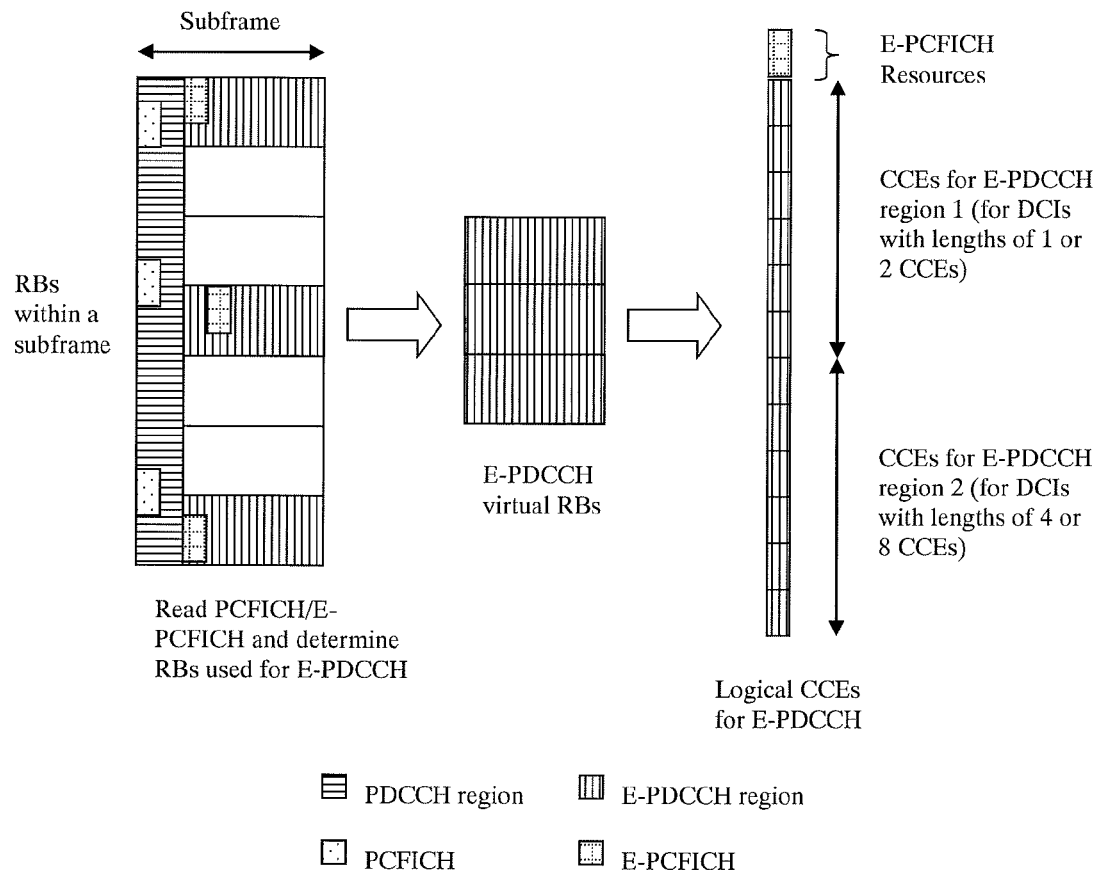
FIG. 13 is a diagram of a procedure for identifying E-PDCCH resources, according to an embodiment of the disclosure.

To further reduce the decoding required by advanced UEs, the semi-static signaling message containing the configuration of the E-PDCCH regions may also include the number of OFDM symbols used for the legacy PDCCH region. In this case, the legacy PDCCH region can be semi-statically configured. Although the legacy PDCCH region remains fixed until a new configuration message is sent, the legacy PCFICH may still need to be signaled in each subframe in order to not affect the operation of the legacy UEs. In this case, advanced UEs are not required to decode the legacy PCFICH. This procedure for defining the E-PDCCH resources is illustrated in FIG. 13.

If multiple RRHs have been configured within the macro cell, then each RRH is configured with an E-PDCCH region that contains separate search spaces for different aggregation levels. A separate E-PCFICH may also be configured for each RRH. The location of the E-PDCCH search space for each RRH can be either fixed or dynamic. In the dynamic case, the location may be determined by the RRH ID, UE RNTI and subframe number. For example, the RRH ID can be used for Y in addition to the UE RNTI when the UE-specific search space $S_k^{(L)}$ is derived. Alternatively, an offset per RRH can be added when the UE-specific search space $S_k^{(L)}$ is derived.

Although the E-PDCCH resources are pre-defined in the semi-static signaling message, not all of the resource blocks may be required. In this case, the unused E-PDCCH resources may be allocated for data, and no resources are wasted.

Figures 14, 15:
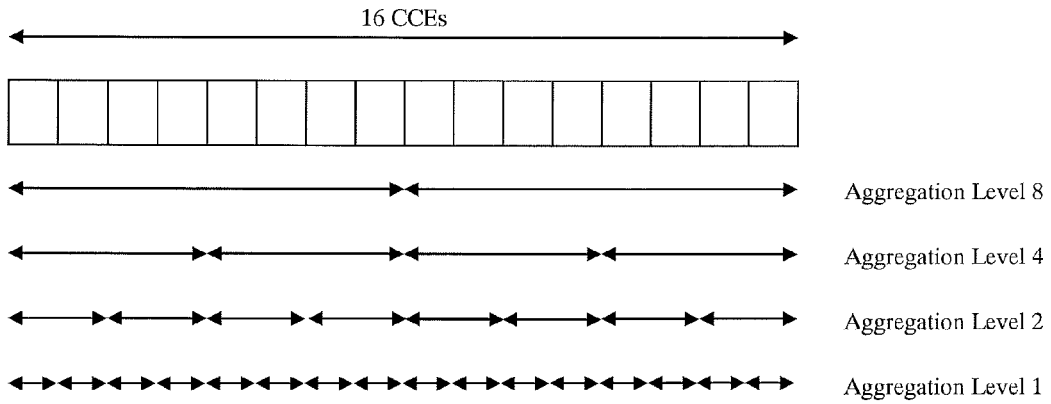
FIG. 14 is an illustration of a UE's blind decoding procedure using a pre-defined E-PDCCH search space, according to an embodiment of the disclosure.
FIG. 15 is a table of extended PCFICH contents for the case where the E-PDCCH is not partitioned according to aggregation level, according to an embodiment of the disclosure.

Alternatively, instead of partitioning the E-PDCCH region for the different aggregation levels, the region may consist of predefined opportunities for the different aggregation levels. The blind decoding opportunities may begin at the first CCE of the E-PDCCH region and continue every L CCEs, where L represents the aggregation level. This approach is illustrated in FIG. 14. In the figure, the blind decoding opportunities are illustrated for each aggregation level for the case where the size of the E-PDCCH region is 16 CCEs. Using this method, the maximum number of blind decodes is given by the following equation.

$$N_{BD}^{EPDCCH} = N_{CCE} + \lfloor N_{CCE}/2 \rfloor + \lfloor N_{CCE}/4 \rfloor + \lfloor N_{CCE}/8 \rfloor$$

In contrast to the previous method, the maximum number of blind decodes using this approach does not depend on what aggregation levels were scheduled. In the example where there are 12 CCEs for the E-PDCCH region, the maximum number of blind decodes is 22, which is equivalent to the worst case using the method where the E-PDCCH region is partitioned. Although the maximum number of blind decodes increases with this method, an advantage is that the E-PC-FICH, in this case, can be used to indicate the size of the E-PDCCH region. An example of the contents of the E-PCFICH for this case is illustrated in Table 5 in FIG. 15. When it is necessary to limit the number of blind decodes, the allowable maximum number of E-PDCCH candidates can be defined per each aggregation level. In this case, the maximum number of blind decodes can be given by the following equation.

$$N_{BD}^{EPDCCH}=\min(N_{CCE},\text{Max}\_1)+\min(\lfloor N_{CCE}/2 \rfloor, \text{Max}\_2)+\min(\lfloor N_{CCE}/4 \rfloor, \text{Max}\_4)+\min(\lfloor N_{CCE}/8 \rfloor, \text{Max}\_4)$$

Max_1, Max_2, Max_4 and Max_8 can be predefined considering the UE processing complexity.

The number of bits in the E-PCFICH may be semi-statically configured using RRC signaling or may be fixed. If there are multiple E-PDCCH regions configured (e.g., for multiple RRHs), then a separate E-PCFICH may be used to indicate the size of each E-PDCCH region. The E-PCFICH may be located within the E-PDCCH region as illustrated in FIG. 13.

Details regarding the second set of embodiments dealing with localized E-PDCCH resources will now be provided. An E-PDCCH region configured using localized resources may be preferred over a distributed E-PDCCH region when frequency selective scheduling is more reliable, for example, when the UE is in a fixed location or moving slowly.

In order to obtain a frequency selective scheduling gain for control, the UEs may be pre-assigned a localized E-PDCCH search space. The localized E-PDCCH search space may be either semi-statically or dynamically signaled to the UEs when the UEs meet the conditions for using the localized E-PDCCH region (i.e., the channel of the corresponding PRBs is good). Alternatively, a UE's localized E-PDCCH search space may depend on the UE's RNTI. The search space may also depend on the subframe number in order to provide user diversity (i.e., to prevent the case where two RNTIs map to the same search space and therefore cannot be scheduled simultaneously).

Figure 16:
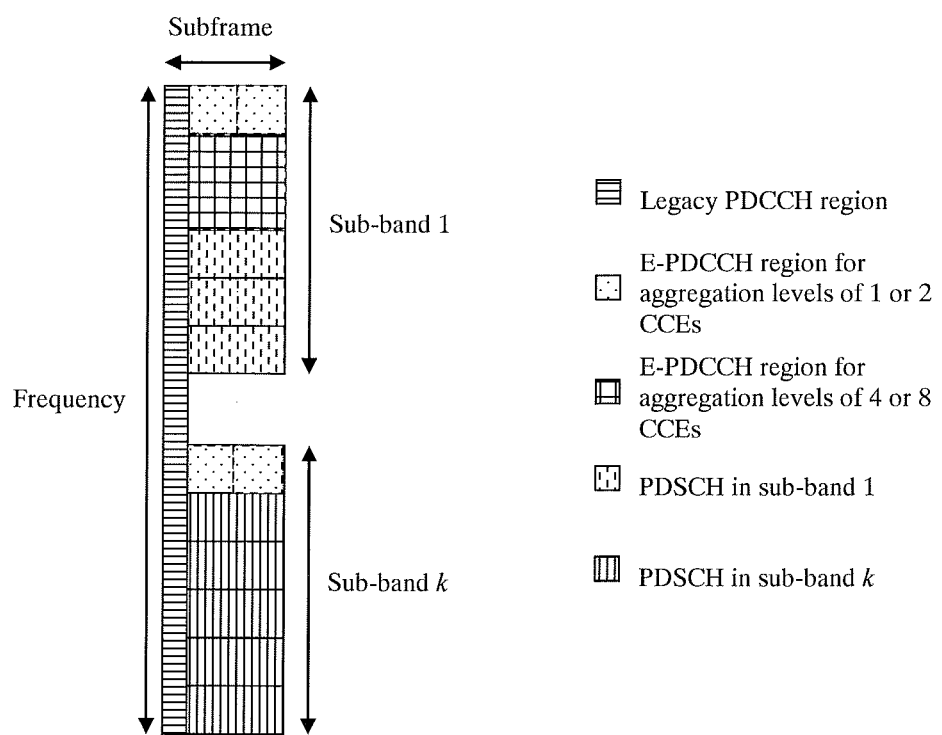
FIG. 16 is a diagram of a common search space for a localized E-PDCCH region, according to an embodiment of the disclosure.

One approach to defining the search space is to use a similar method as in the distributed case where all the UEs or a group of UEs have the same E-PDCCH search space. In this approach, an E-PDCCH region is defined within each sub-band for scheduling resources within the sub-band. Multiple search spaces may be defined within each sub-band for different aggregation levels in order to reduce the maximum number of blind decodes required by each UE. This approach is illustrated in FIG. 16. An extended PCFICH or a new DCI may also be transmitted within the legacy PDCCH region to indicate the presence of the localized E-PDCCH region.

Alternatively, each UE may be allocated a different PRB or different CCEs based on the UE's RNTI within each sub-band. For frequency selective scheduling using localized E-PDCCH regions, the UE-specific search space is defined for each sub-band, and one starting point is derived for each sub-band. To reduce complexity, the starting point in each sub-band may have the same offset relative to the beginning of the sub-band. For example, if the same equation as in LTE Rel-8 is used for the UE-specific search space, the same random number based on the UE's RNTI is applied for the UE-specific search space in each sub-band. When the UE performs blind decoding, the UE begins at the starting point in each sub-band and continues searching each sub-band until a DCI is found. The UE may perform blind decoding for all CCEs in an E-PDCCH region. Alternatively, the UE may perform blind decoding for a limited number of CCEs if the number of blind decodings is limited for the E-PDCCH region in each sub-band. For example, assuming the maximum allowed number of blind decodings is M, the allowed number of blind decodings per sub-band can be M divided by the number of sub-bands including E-PDCCH region. The DCIs for both uplink and downlink assignments may be located within the E-PDCCH region. The UE's search space may also depend on the subframe number to provide user diversity.

Figure 17:
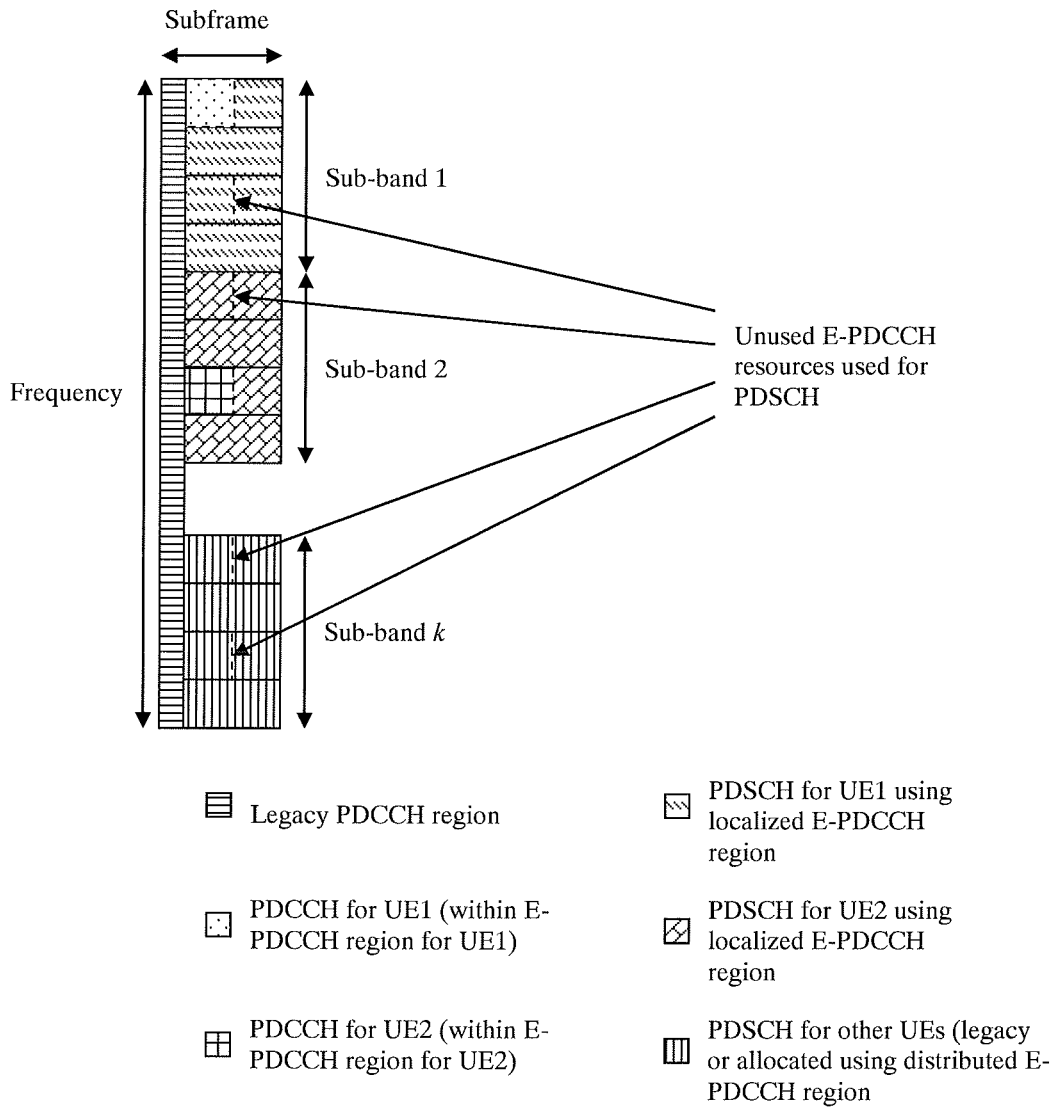
FIG. 17 is a diagram of a UE-specific localized E-PDCCH search space, according to an embodiment of the disclosure.

If the UE is scheduled the whole sub-band, the UE could assume that there is no PRB used for the E-PDCCH to other UEs except its own E-PDCCH, as shown in FIG. 17. Alternatively, if a PRB is used for the E-PDCCH for another UE, e.g., for an uplink grant, the eNB could indicate the existence of the E-PDCCH of other UEs, and the corresponding PRBs would not be used for PDSCH transmission. The indication may be included in a downlink grant.

Since, in this case, the DCI for allocating the downlink resources is located within the same sub-band as the PDSCH for the same UE, the number of bits used to indicate which resources are used for the PDSCH within the sub-band may be reduced. The number of bits required to specify the resources depends on the number of resource blocks in each sub-band. Alternatively, in another embodiment, the number of bits to specify the assigned resources may remain the same. In this case, if the UE reports a good channel condition on multiple sub-bands, then the UE may be scheduled on multiple sub-bands with one PDCCH within the E-PDCCH region of one of the sub-bands.

Details regarding the third set of embodiments dealing with UE power saving in DRX mode with the E-PDCCH will now be provided. In a first embodiment in this third set of embodiments, it is assumed that the UE monitors both the legacy PDCCH region and the E-PDCCH region. Monitoring the legacy PDCCH region or the E-PDCCH region means attempting decoding each of the PDCCHs transmitted in the common or UE-specific search space in the legacy control region or in the PDSCH region resepctively. In this scenario, when the UE goes to DRX mode, the UE monitors the legacy PDCCH region and stops monitoring the E-PDCCH region when the UE transits from non-active time to active time. For example, the transition from non-active time to active time happens when the onDurationTimer is started at every DRX cycle to check if a PDCCH has been transmitted to the UE. Alternatively, the eNB may signal the UE to monitor the legacy PDCCH region only via RRC signaling, MAC control element signaling or physical signaling. This mode of operation saves the UE power consumption by reducing the number of decoding processes for the E-PDCCH. The UE could monitor only the common search space in the legacy PDCCH region or both the common search space and the UE-specific search space in the legacy PDCCH region. When the UE detects a PDCCH at subframe n in the legacy PDCCH region, the UE starts monitoring the E-PDCCH region from the (n+k) subframe. k can be semi-statically configured or can be predetermined based on the required processing time to decode the PDCCH. The UE could stop monitoring the legacy PDCCH region or the UE could continue monitoring the legacy PDCCH region along with the E-PDCCH when monitoring the E-PDCCH region is resumed after the (n+k) subframe.

Figure 18:
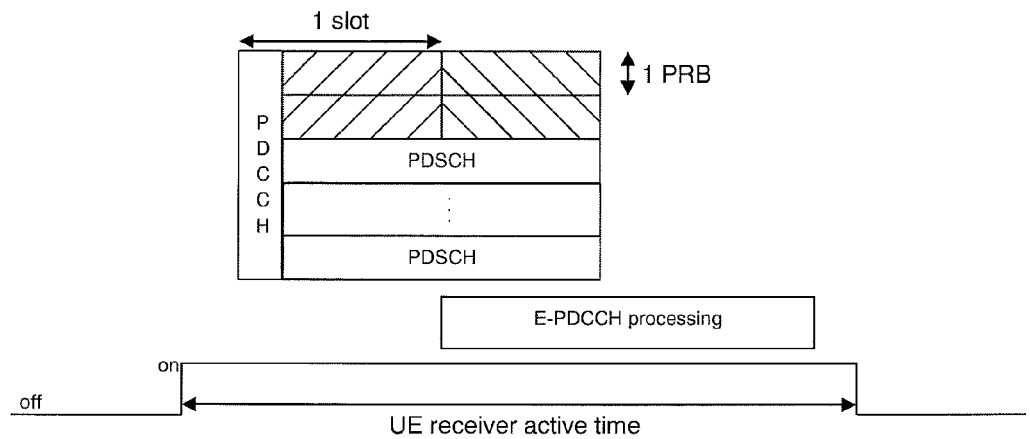
FIG. 18 is a diagram of UE receiver active time under a solution for UE power saving in DRX, according to an embodiment of the disclosure.

In a second embodiment in this third set of embodiments, the UE monitors the E-PDCCH only in the first slot when the UE transits from non-active time to active time. For example, the transition from non-active time to active time happens when the onDurationTimer is started at every DRX cycle to check if a PDCCH has been transmitted to the UE. Alternatively, the eNB may signal the UE to monitor the first slot only via RRC signaling, MAC control element signaling or physical signaling. This approach could be useful if the E-PDCCH is designed as in the relay PDCCH (R-PDCCH) structure. In the R-PDCCH, the PDCCH for a downlink grant is transmitted in the first slot, while the PDCCH for an uplink grant is transmitted in the second slot. Therefore, REGs are distributed over OFDM symbols in either the first slot or the second slot. In the E-PDCCH region, it may be possible that both a downlink grant and an uplink grant are transmitted in both slots. However, CCEs of one PDCCH are distributed within one slot. FIG. 18 shows the UE receiver active time under this second embodiment. If the UE monitors the E-PDCCH in the first slot only, the UE can start E-PDCCH decoding immediately after the first slot. Consequently, the receiver active time is reduced by one slot. The UE can start monitoring the second slot of the E-PDCCH when there is DCI (including a downlink grant and an uplink grant) for that UE or when the UE sends a scheduling request when uplink data arrives in the uplink buffer.

Figure 19:
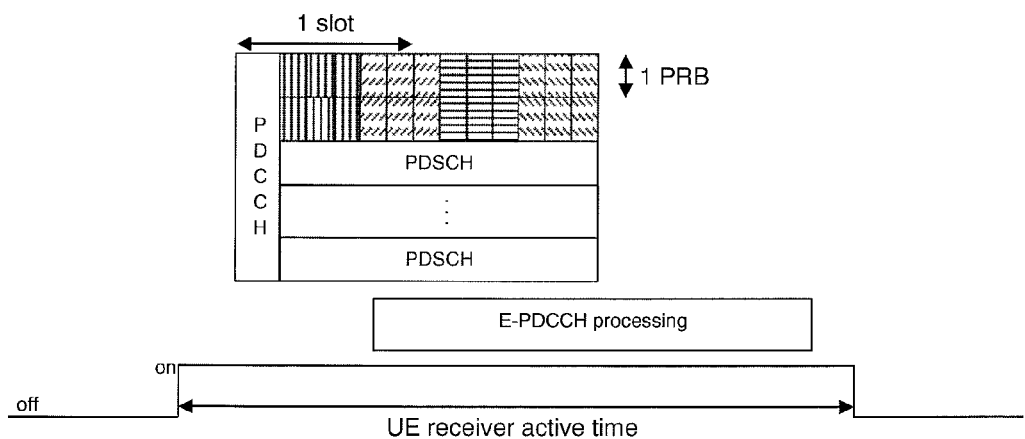
FIG. 19 is a diagram of UE receiver active time under another solution for UE power saving in DRX, according to an embodiment of the disclosure.

In a third embodiment in this third set of embodiments, the UE monitors the E-PDCCH for the first M OFDM symbols when the UE transits from non-active time to active time. For example, the transition from non-active time to active time happens when the onDurationTimer is started at every DRX cycle to check if a PDCCH has been transmitted to the UE. Alternatively, the eNB may signal the UE to monitor the E-PDCCH for the first M OFDM symbols only via RRC signaling, MAC control element signaling or physical signaling. This embodiment is applicable when multiple E-PDCCHs are multiplexed in the time domain instead of being distributed over the subframe. The value M can be determined based on the number of OFDM symbols on which one CCE is distributed or on which the PDCCHs that the UE should monitor are distributed. FIG. 19 shows the UE receiver active time under this third embodiment. It is possible that the search space of the UE consists of all OFDM symbols in the E-PDCCH block but that the UE monitors the first three OFDM symbols that may transmit one E-PDCCH. This means that the number of E-PDCCH candidates in the search space can be reduced for a UE in DRX mode. Once the UE receives the E-PDCCH in the active mode, the UE can increase the number of PDCCH candidates so that the UE monitors the whole E-PDCCH region.

Details regarding the fourth set of embodiments dealing with the evolution of the PDCCH to the E-PDCCH will now be provided. Since advanced UEs may be required to monitor only the new E-PDCCH region, the legacy PDCCH region may be required only when there are legacy UEs to serve. Initially, when the E-PDCCH region is first introduced, the legacy PDCCH region and the E-PDCCH region may both be present in each subframe to serve both legacy UEs and advanced UEs. As the number of legacy UEs declines, the PDCCH region may no longer be required in some subframes and may be eliminated in order to reduce overhead and improve the overall spectral efficiency.

During the transition when both the PDCCH and the E-PDCCH are used, advanced UEs can be signaled the starting point for the PDSCH region because the advanced UEs would not need to receive the legacy PDCCH region for simple operation. This information may be included in the E-PDCCH configuration information. Although this information may be obtained from the PCFICH, if the legacy PDCCH region is to be eventually eliminated, the PCFICH will also be eliminated. In this case, an alternate signaling method may be required, or an advanced UE can assume that the PDSCH starting point is the first OFDM symbol.

During the transition, it may also be possible that some subframes support the legacy PDCCH region and in other subframes the legacy PDCCH is not transmitted. In this case, two different starting points may need to be signaled for the subframe supporting the legacy PDCCH region and the subframe not supporting the legacy PDCCH region. Alternatively, for a subframe not supporting the legacy PDCCH region, an advanced UE can assume that the PDSCH starting point is the first OFDM symbol.

One approach is to semi-statically configure the size of the legacy PDCCH region and to use RRC signaling to indicate the starting OFDM symbol of the PDSCH region when only the E-PDCCH is configured. Legacy UEs will still decode the PCFICH to determine the starting OFDM symbol.

If there are no active legacy UEs present, or for some new carriers that do not support legacy UEs, then the legacy PDCCH, PCFICH and PHICH may not need to be transmitted, and the PDSCH region may start on the first OFDM symbol. An extended PHICH region may be defined for signaling downlink acknowledgements and negative acknowledgements when the E-PDCCH is used.

If there are active legacy UEs when there is no PDCCH and PCFICH configured, the legacy UEs will attempt to decode the PCFICH and will fail. There is no impact to the legacy UEs as long as the legacy UEs are scheduled in the subframe in which the PCFICH and PDCCH are transmitted. The CRS remains within the legacy PDCCH region in order to not affect the legacy UE's radio resource management (RRM) measurements or channel estimation procedure.

An advanced UE should receive system information when the UE is in idle mode, which is scheduled with a PDCCH in the common search space in the legacy PDCCH region. The PDCCH for system information can be transmitted in the E-PDCCH region. However, since an idle mode UE does not know whether the camped cell transmits the PDCCH in the E-PDCCH region, an indication may be required. This indicator can be included in the master information block, which does not require a PDCCH. As shown in the RRC signaling in FIG. 20, a spare bit can be used to indicate the existence of the common E-PDCCH region. The exact E-PDCCH region for the common search space can be predefined, or the configuration information could be included in the master information block, as shown in FIG. 20.

Details regarding the fifth set of embodiments dealing with an extended PHICH (E-PHICH) will now be provided. Currently, a PHICH resource is indicated by the index pair $(n_{PHICH}^{group}, n_{PHICH}^{seq})$, where $n_{PHICH}^{group}$ represents the PHICH group and $n_{PHICH}^{seq}$ is the orthogonal sequence index within the PHICH group. When an E-PDCCH region is configured, a new parameter can be introduced that represents an offset to the PHICH group index, $n_{PHICH}^{group}$. The new parameter, $n_{EPDCCH,k}^{group}$ represents the group offset for the $k^{th}$ E-PDCCH region. Advanced UEs can use the following equations to determine the PHICH resource.

$$n_{PHICH}^{group} = (I_{PRB\_RA} + N_{DMRS}) \bmod N_{PHICH}^{group} + n_{EPDCCH,k}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

If the group offset parameter is set to zero, the PHICH resource maps to the legacy PHICH resources. This approach can be used when resources for the uplink grants sent from the E-PDCCH region do not overlap with the resources for grants sent from the legacy PDCCH region. Otherwise, when there are multiple grants for the same uplink resources, as in the case of multiple RRHs within a cell, the E-PHICH resources may be required. In general, if orthogonal uplink resources are scheduled from different E-PDCCH regions, then the mapping to PHICH resources will be orthogonal and the same PHICH group offset may be used. The new PHICH group offset parameter may be signaled to advanced UEs as part of the E-PDCCH configuration information.

In the above approach, it is assumed that the number of PHICH groups is the same for each new E-PDCCH region, and the number of groups equals the number of groups used in the legacy region. However, it may be necessary to configure a different number of PHICH groups for different regions. This case may arise when different E-PDCCH regions have been configured for different RRHs. Since the loading at each RRH may be different, the number of PHICH groups required for each RRH may be different. In this case, the number of PHICH groups for the $k^{th}$ E-PDCCH region can be represented by $N_{PHICH,k}^{group}$. The equation for defining the PHICH group for this case is the following.

$$n_{PHICH}^{group} = (I_{PRB\_RA} + n_{DMRS}) \bmod N_{PHICH,k}^{group} + n_{EPDCCH,k}^{group}$$

A non-zero offset for the $k^{th}$ E-PDCCH region can be defined as $$n_{EPDCCH,k}^{group} = \sum_{i=1}^{k-1} N_{PHICH,i}^{group} (n_{EPDCCH,i}^{group} > 0)$$

where $N_{PHICH,1}^{group} = N_{PHICH}^{group}$ and $N_{PHICH,i}^{group} = N_{PHICH}^{group}$ is the group offset is zero.

The number of PHICH groups for each E-PDCCH region can be defined as $$N_{PHICH,k}^{group} = \begin{cases} \lceil N_{g,k}(N_{RB}^{DL}/8) \rceil, & \text{normal } CP \\ 2\lceil N_{g,k}(N_{RB}^{DL}/8) \rceil, & \text{extended } CP \end{cases}$$

where $N_{g,k}$ is the value of $N_g \in \{1/6, 1.2, 1, 2\}$ used for the $k^{th}$ E-PDCCH region.

The number of PHICH groups for an E-PDCCH region can be signaled to advanced UEs as part of the E-PDCCH configuration information.

Details regarding the sixth set of embodiments dealing with resource mapping for the E-PHICH will now be provided. Since the resources used for the E-PHICH should not interfere with the operation of legacy UEs, a new block of resources not used by the legacy UEs may need to be defined. There are several options for defining the E-PHICH resources. Specifically, the resources may be within the OFDM symbols used for the PDCCH, the resources may be within the RBs normally used for the PDSCH, or the resources may be within the RBs normally used by an E-PDCCH region. Each of these options will be considered in more detail below.

In the existing PHICH design, the target PHICH error probability is 0.1%. In order to maintain the same error probability for the E-PHICH, the resources used may need to be signaled or fixed to the UE independently with the control region size signaled by the PCFICH. If the location of the E-PHICH depends on the contents of the PCFICH, the error probability of the PHICH may be larger than 1% because the combined target error probability of the PDCCH/PCFICH is 1% in an LTE system.

Details regarding the option where E-PHICH resources are within the PDCCH region are now provided. The legacy PDCCH region is located on the first one to three OFDM symbols within a subframe. The number of OFDM symbols used is signaled in the PCFICH channel, which is located within the first OFDM symbol. The legacy PHICH resources are located within the first OFDM symbol or within the first two or three OFDM symbols in the case of an E-PHICH duration. The resources used for the PCFICH and the PHICH are cell-specific and known to the UEs. The REGs that are not used by the PCFICH are numbered according to a cell-specific order. The REGs are then allocated to the PHICH groups sequentially.

If the remaining available resources are to be used for the E-PHICH groups in addition to the DCI sent to the UEs, the E-PHICH resources should not interfere with the DCIs sent to the UEs from within the normal PDCCH region. Since legacy UEs are not aware of the E-PHICH, the DCIs for the legacy UEs can only be sent if they do not collide with the E-PHICH.

Alternatively, a group RNTI can be defined for determining the location of the E-PHICH resources. Multiple group RNTIs may be defined to provide frequency diversity for the E-PHICH resources. The E-PHICH group RNTI can define the E-PHICH resources in a manner similar to the C-RNTI determining the UE's search space for DCIs within the normal PDCCH region. In this case, proper scheduling should also be used to avoid the collision of legacy UE DCIs with the E-PHICH resources. The E-PHICH group RNTI and the number of REGs used for the E-PHICH resources may be signaled to the UEs along with the E-PDCCH configuration information.

Details regarding the option where E-PHICH resources are within the E-PDCCH region are now provided. The E-PDCCH regions may consist of either distributed RBs or localized RBs. In either case, some of the REGs that are contained within the E-PDCCH regions may be used to define the E-PHICH groups. One way to define the E-PHICH resources is to reserve some REGs from each of the RBs used for the E-PDCCH regions. The REGs from the different RBs may be added to the E-PHICH resources sequentially. This mapping can be defined as follows, where $N_{PHICH}^{group}$ is the number of E-PHICH groups and $N_{PHICH}^{REG}$ is the required number of REGs for one E-PHICH group.

1. Number the E-PDCCH RBs from 0 to $n_{RB}^{EPDCCH} - 1$.
2. Number the REGs within each E-PDCCH RB from 0 to $n_{REG}^{EPDCCH} - 1$ starting from the lowest time and frequency domain indices. The REGs within each RB may be ordered in the frequency domain first and then by time or vice versa.
3. Initialize m=0 (extended PHICH mapping unit).
4. For each REG, k=0, 1, ..., $n_{REG}^{EPDCCH} - 1$
   a. For each RB, i=0, 1, ..., $n_{RB}^{EPDCCH} - 1$
      i. Extended PHICH m is given by the REG defined by the RB/REG pair (i, k)
      ii. Increase m by 1.
5. Repeat until all extended PHICH mapping units have been assigned (i.e., m=$N_{PHICH}^{REG} \times N_{PHICH}^{group} - 1$).

The E-PHICH resource mapping may be a function of the total number of E-PDCCH RBs and the total number of E-PHICH groups, which may be signaled to advanced UEs along with the E-PDCCH configuration information.

In the third option, the E-PHICH resources may be within the resources used for the PDSCH. The RBs containing the E-PHICH resources multiplex the E-PHICH with PDSCH data. The RBs used for the E-PHICH may be defined similarly to the manner in which the E-PDCCH regions are defined. For example, the number and location of E-PHICH RBs may be signaled to advanced UEs. In addition, the amount of PHICH resources within an RB may be signaled in order to allow PDSCH data to be transmitted in the same RB. A cell-specific RB hopping pattern may be used to define the RBs containing the E-PHICH resources. Once the RBs are defined, the same E-PHICH resource mapping algorithm can be used as in the case where the E-PHICH resources are contained within the E-PDCCH region.

Since only advanced UEs are aware of the E-PHICH, the RBs used for the E-PHICH can only be used in the PDSCH for advanced UEs. The number of RBs that are used for the E-PHICH and that are multiplexed with the PDSCH may need to be signaled to the advanced UEs. A cell-specific hopping pattern may need to be defined. The hopping pattern and the number of RBs can be used by the UEs to determine the location of the E-PHICH resources. Advanced UEs know which REs in the PDSCH RBs are used by the E-PHICH, and hence PDSCH data can be rate-matched so that the PDSCH data does not use REs for the E-PHICH.

The embodiments provided herein can reduce the maximum number of blind decodes for advanced UEs in DRX mode and for advanced UEs in general. A flexible E-PDCCH design is introduced that minimizes overhead. No resources are wasted by pre-allocating resources for the E-PDCCH when they are not needed. An E-PDCCH design is described for both distributed and localized resources to allow for both frequency diversity and frequency selective scheduling. The design provides support for multiple E-PDCCH regions for multiple RRHs. In addition, a method for evolving LTE to use only the more efficient E-PDCCH is described. Also, an extended PHICH region is defined to allow the evolution to an E-PDCCH-only system.

Figure 21:
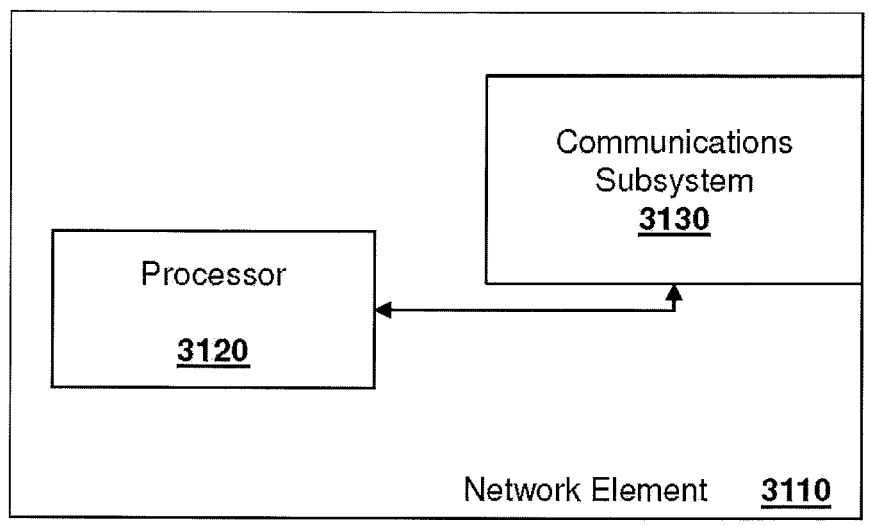
FIG. 21 is a simplified block diagram of an exemplary network element according to one embodiment.

The above may be implemented by a network element. A simplified network element is shown with regard to FIG. 21. In FIG. 21, network element 3110 includes a processor 3120 and a communications subsystem 3130, where the processor 3120 and communications subsystem 3130 cooperate to perform the methods described above.

Further, the above may be implemented by a UE. One exemplary device is described below with regard to FIG. 22. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 22:
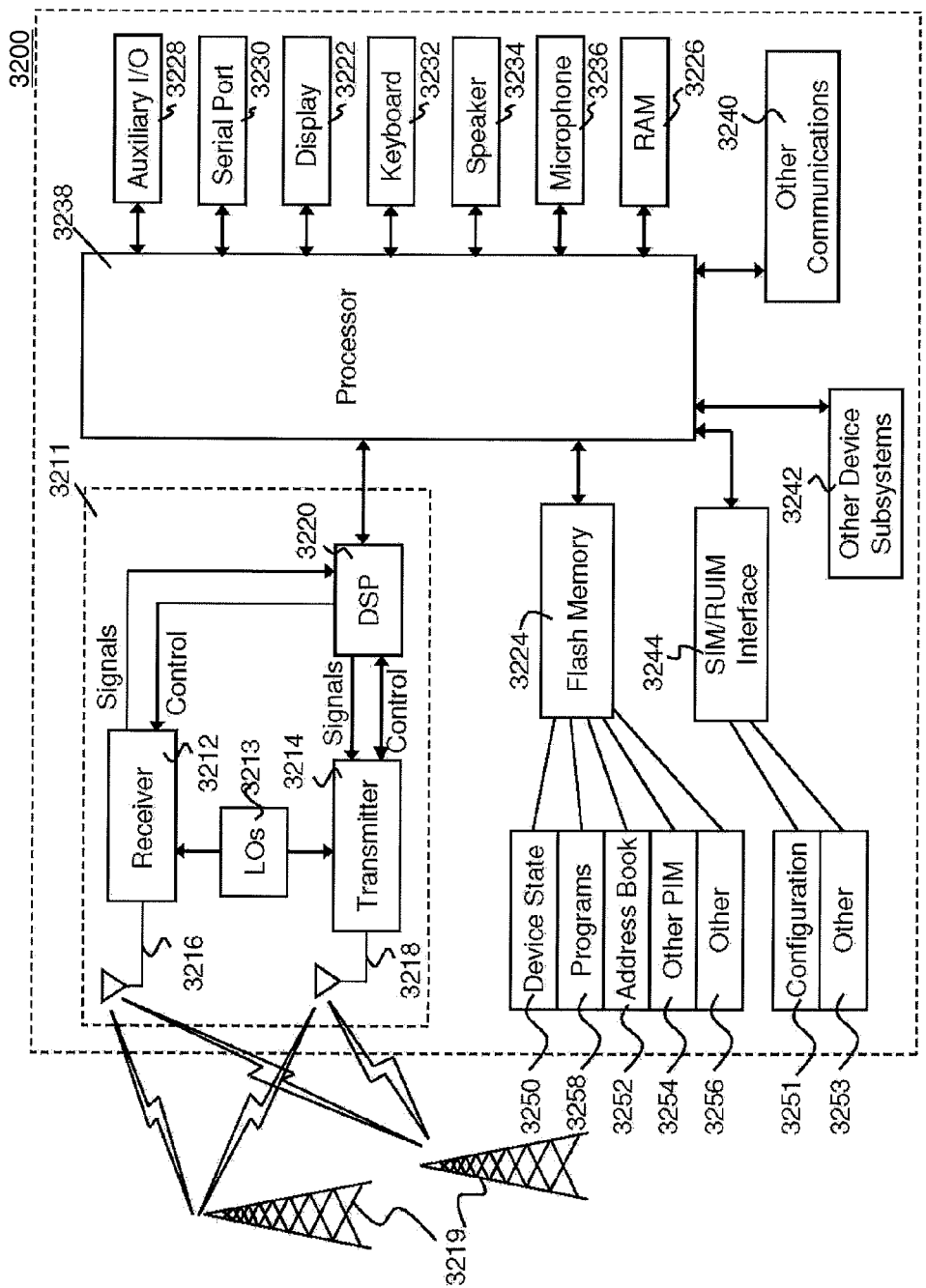
FIG. 22 is a block diagram with an example user equipment capable of being used with the systems and methods in the embodiments described herein.

When required network registration or activation procedures have been completed, UE 3200 may send and receive communication signals over the network 3219. As illustrated in FIG. 22, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in FIG. 22 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 22 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 23:
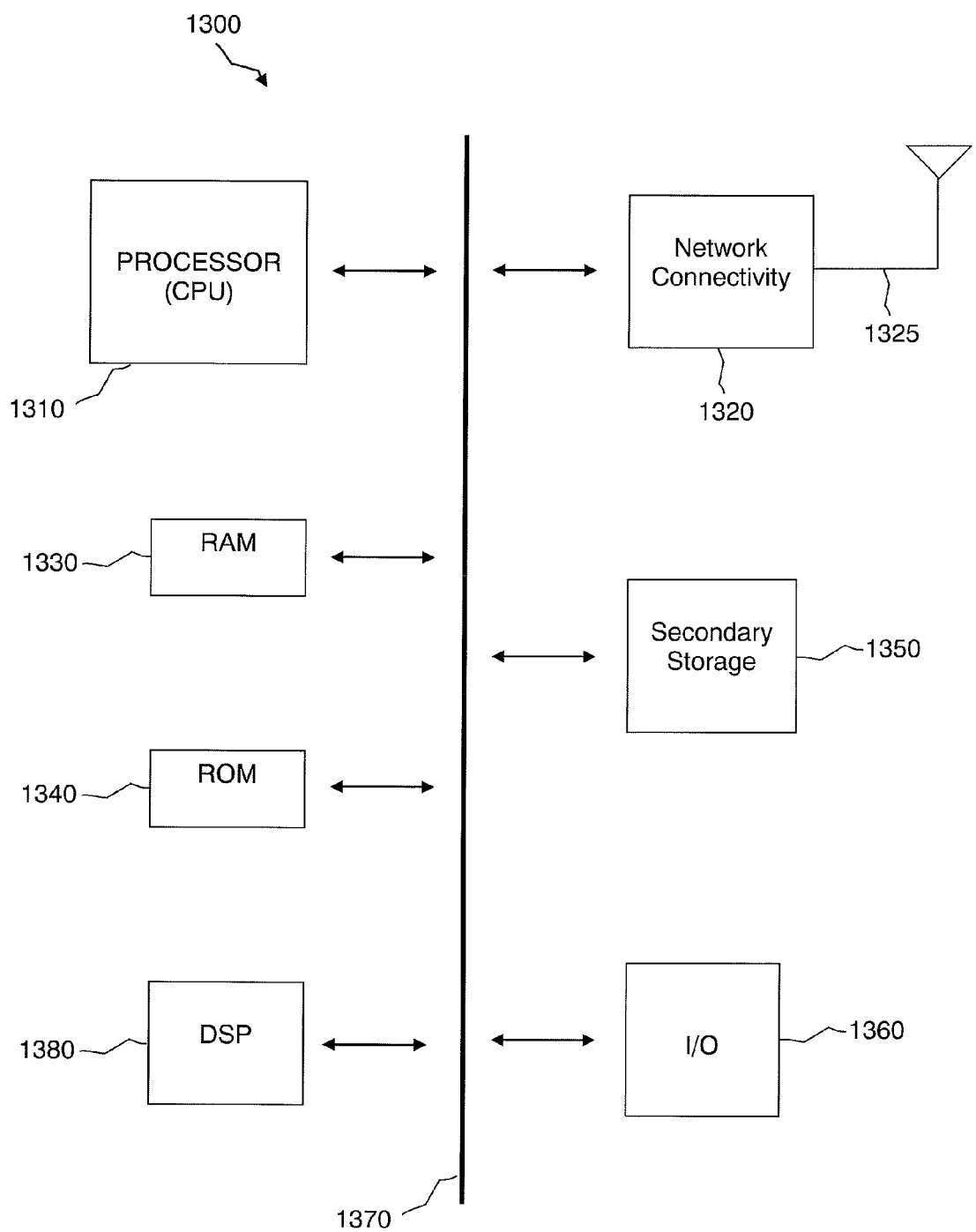
FIG. 23 illustrates a processor and related components suitable for implementing the several embodiments of the present disclosure.

The UE and other components described above might include a processing component that is capable of executing instructions related to the actions described above. FIG. 23 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a UE is provided. The UE comprises a receiver and a processor. The receiver is configured to receive an E-PDCCH in an E-PDCCH region that has been partitioned into at least two partitions. A first partition contains CCEs with a first set of aggregation levels, and a second partition contains CCEs with a second set of aggregation levels. The processor is configured to process the E-PDCCH.

In another embodiment, a UE is provided. The UE comprises a processor configured such that the UE performs blind decoding in an E-PDCCH region, wherein blind decoding opportunities occur at regular, predefined intervals of CCEs within the E-PDCCH region.

The following are incorporated herein by reference for all purposes: 3GPP Technical Specification (TS) 36.211, 3GPP TS 36.212, and 3GPP TS 36.213.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
    a processor configured to receive an extended physical downlink control channel (E-PDCCH) in an E-PDCCH region that has been partitioned into at least two partitions, wherein a first partition contains control channel elements (CCEs) with a first set of aggregation levels, and a second partition contains CCEs with a second set of aggregation levels,
    wherein in the first partition, the processor is configured to perform blind decodes at regular, predefined intervals of CCEs based on the first set of aggregation levels.

2. The UE of claim 1, wherein in the first partition, the processor is further configured to perform the blind decodes over a number of CCEs equal to a number of CCEs in the first set of aggregation levels, and in the second partition, the processor is further configured to perform blind decodes over a number of CCEs equal to a number of CCEs in the second set of aggregation levels.

3. The UE of claim 1, wherein the first set of aggregation levels is one or two CCEs, and the second set of aggregation levels is four or eight CCEs.

4. The UE of claim 1, wherein the processor is further configured to receive information regarding the aggregation level semi-statically via radio resource control (RRC) signaling.

5. The UE of claim 1, wherein the processor is further configured to receive information regarding the aggregation level in an extended physical control format information channel (E-PCFICH).

6. The UE of claim 5, wherein the E-PCFICH is at least one of:
    dynamically signaled in a legacy PDCCH region; and
    included in the E-PDCCH region, wherein RRC signaling provides information regarding a number of CCEs used for the E-PCFICH.

7. The UE of claim 5, wherein the information regarding the aggregation level includes information regarding a number of resource blocks used for each of a plurality of E-PDCCH regions.

8. The UE of claim 7, wherein each of the plurality of E-PDCCH regions has an associated E-PCFICH providing information regarding the aggregation level.

9. The UE of claim 1, wherein the processor is further configured to receive information regarding a size of the E-PDCCH region in an extended physical control format information channel (E-PCFICH).

10. The UE of claim 9, wherein the processor is further configured to receive semi-static signaling that indicates possible values of the E-PCFICH.

11. A user equipment (UE), comprising:
    a processor configured to perform blind decoding in an extended physical downlink control channel (E-PDCCH) region, wherein blind decoding opportunities occur at regular, predefined intervals of control channel elements (CCEs) based on an aggregation level of the CCEs within the E-PDCCH region.

12. The UE of claim 11, wherein the processor is further configured to receive information regarding a size of the E-PDCCH region in an extended physical control format information channel (E-PCFICH).

13. The UE of claim 12, wherein the processor is further configured to receive semi-static signaling that indicates possible values of the E-PCFICH.

14. A method comprising:
    receiving, at a user equipment, an extended physical downlink control channel (E-PDCCH) in an E-PDCCH region that has been partitioned into at least two partitions, wherein a first partition contains control channel elements (CCEs) with a first set of aggregation levels, and a second partition contains CCEs with a second set of aggregation levels; and performing, by the user equipment, blind decodes at regular, predefined intervals of CCEs based on the first set of aggregation levels.

15. The method of claim 14, further comprising:

in the first partition, performing the blind decodes over a number of CCEs equal to a number of CCEs in the first set of aggregation levels, and in the second partition, performing blind decodes over a number of CCEs equal to a number of CCEs in the second set of aggregation levels.

16. The method of claim 14, wherein the first set of aggregation levels is one or two CCEs, and the second set of aggregation levels is four or eight CCEs.

17. The method of claim 14, further comprising:

receiving information regarding the aggregation level semi-statically via radio resource control (RRC) signaling.

18. The method of claim 14, further comprising:

receiving information regarding the aggregation level in an extended physical control format information channel (E-PCFICH).

19. The method of claim 18, wherein the E-PCFICH is at least one of:

dynamically signaled in a legacy PDCCH region; and included in the E-PDCCH region, wherein RRC signaling provides information regarding a number of CCEs used for the E-PCFICH.

* * * * *